United States Patent [19]
Wild

[11] Patent Number: 5,199,174
[45] Date of Patent: Apr. 6, 1993

[54] SAWDUST REMOVAL APPARATUS

[76] Inventor: Jeffrey C. Wild, 46 Green Garden Ct., East Haven, Conn. 06512

[21] Appl. No.: 867,499

[22] Filed: Apr. 13, 1992

[51] Int. Cl.$^5$ ............................................. B27B 19/09
[52] U.S. Cl. .................................... 30/123.3; 30/392; 408/61
[58] Field of Search ................. 30/124, 514, 516, 392, 30/393, 123.3, 123.4, 390; 408/56, 61

[56] References Cited

U.S. PATENT DOCUMENTS

| | | | |
|---|---|---|---|
| 2,902,067 | 9/1959 | Oakley | 30/392 |
| 3,033,252 | 5/1962 | Atkinson | 30/392 |
| 3,267,974 | 8/1966 | Elson | 30/390 |
| 3,882,598 | 5/1975 | Earle et al. | 30/390 |
| 4,195,403 | 4/1980 | Gruber | 30/392 |
| 4,870,755 | 10/1989 | Schnizler | 30/123.3 |
| 5,046,255 | 9/1991 | Lebreux | 30/390 |
| 5,084,971 | 2/1992 | Remington et al. | 30/123.3 |

Primary Examiner—Douglas D. Watts
Assistant Examiner—Hwei-Siu Payer
Attorney, Agent, or Firm—Leon Gilden

[57] ABSTRACT

A saw member is arranged to receive a manifold housing in securement about a saw member housing, with the manifold including a directional conduit directed into the manifold oriented at a cutting line to remove sawdust from the cutting line for enhanced visibility during a cutting procedure utilizing the saw member. The manifold housing is arranged with apertures in confronting relationship to vent openings of the saw member, or may optionally include in addition to the apertures a blower motor assembly in the absence of vent apertures of the saw member to direct pressurized air through the directional conduit.

5 Claims, 4 Drawing Sheets

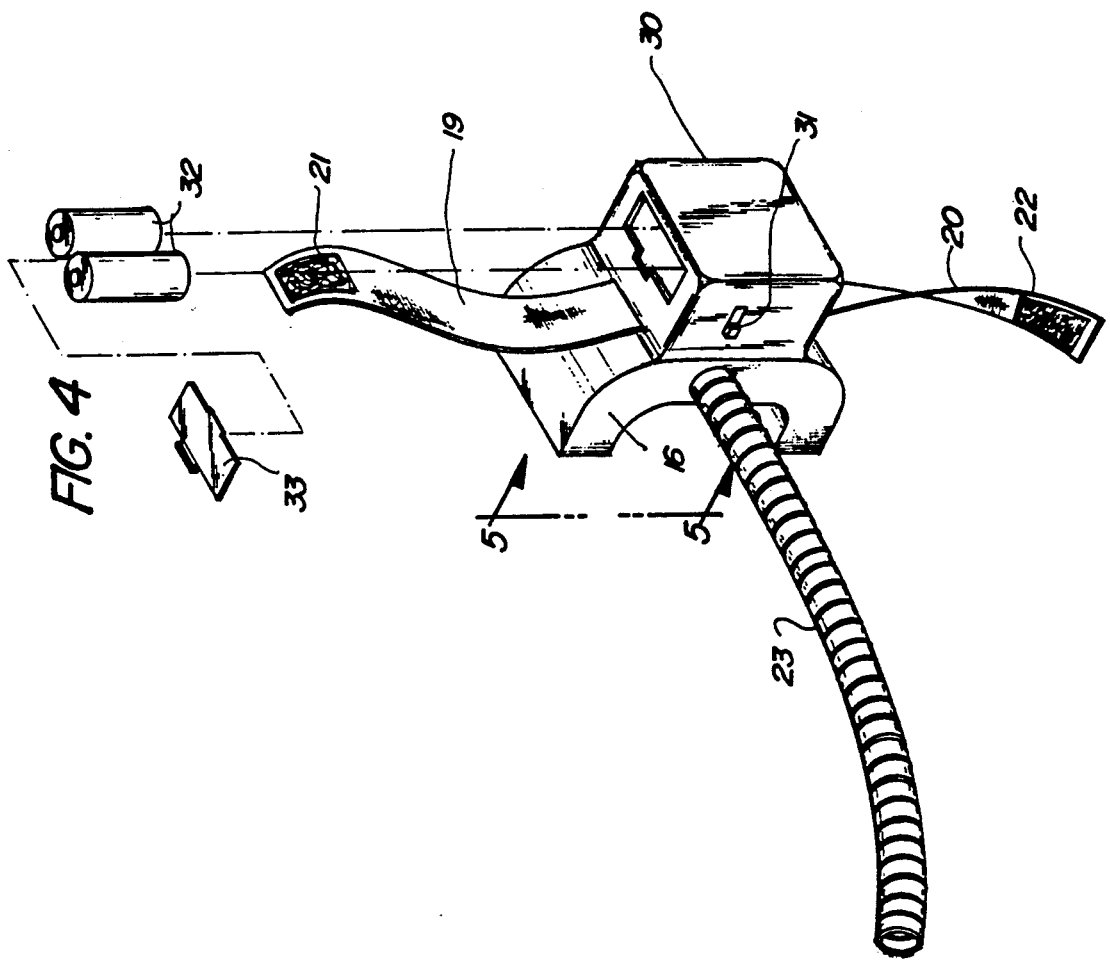
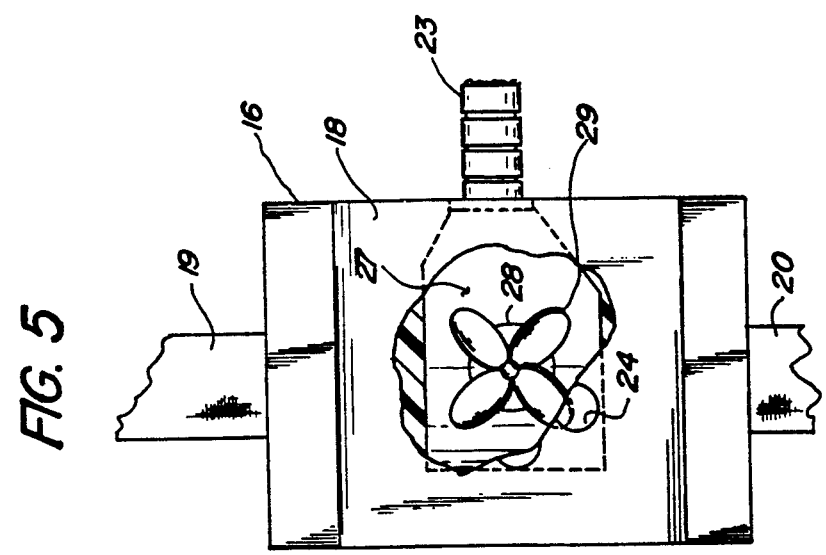

SAWDUST REMOVAL APPARATUS

BACKGROUND OF THE INVENTION

1. Field of the Invention

The field of invention relates to sawdust removal apparatus, and more particularly pertains to a new and improved sawdust removal apparatus wherein the same is arranged to remove sawdust from a cutting line of a saw member assembly.

2. Description of the Prior Art

Sawdust removal of various types utilized in the prior art are typically arranged to vacuum sawdust relative to a housing and saw blade, or optionally provide for the diversion of sawdust debris relative to a cutting line. Such an apparatus is set forth in U.S. Pat. No. 4,195,403 to Gruber wherein an exhaust port in a saw member receives a housing thereover to divert pressurized air onto a cutting line.

U.S. Pat. No. 4,742,743 to Scarpone sets forth a structure to direct air in conjunction with an original arm saw to remove sawdust buildup relative to a cutting line.

U.S. Pat. No. 3,662,796 to Batistelli sets forth a sawdust deflector for use with a portable saw, wherein a semicircular channel secured to the saw diverts air to a cutting line of a saw member.

As such, it may be appreciated that there continues to be a need for a new and improved sawdust removal apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of sawdust removal apparatus now present in the prior art, the present invention provides a sawdust removal apparatus wherein the same is arranged to utilize a flexible conduit permitting selective orientation relative to a saw blade of a saw member for diversion of excess sawdust buildup relative to the saw blade during a cutting procedure. As such, the general purpose of the present invention, which will be described subsequently in greater detail, is to provide a new and improved sawdust removal apparatus which has all the advantages of the prior art sawdust removal apparatus and none of the disadvantages.

To attain this, the present invention provides a saw member arranged to receive a manifold housing in securement about a saw member housing, with the manifold including a directional conduit directed into the manifold orientated at a cutting line to remove sawdust from the cutting line for enhanced visibility during a cutting procedure utilizing the saw member. The manifold housing is arranged with apertures in confronting relationship to vent openings of the saw member, or may optionally include in addition to the apertures a blower motor assembly in the absence of vent apertures of the saw member to direct pressurized air through the directional conduit.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the Public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved sawdust removal apparatus which has all the advantages of the prior art sawdust removal apparatus and none of the disadvantages.

It is another object of the present invention to provide a new and improved sawdust removal apparatus which may be easily and efficiently manufactured and marketed It is a further object of the present invention to provide a new and improved sawdust removal apparatus which is of a durable and reliable construction.

An even further object of the present invention is to provide a new and improved sawdust removal apparatus which is susceptible of a low cost of manufacture with regard to both materials and labor, and which accordingly is then susceptible of low prices of sale to the consuming public, thereby making such sawdust removal apparatus economically available to the buying public.

Still yet another object of the present invention is to provide a new and improved sawdust removal apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4. is an isometric illustration of the apparatus, including a blower motor contained therewithin.

FIG. 5. is an orthographic view, taken along the lines 5—5 of FIG. 4 in the direction indicated by the arrows.

DESCRIPTION OF THE PREFERRED EMBODIMENT

Figure 1:
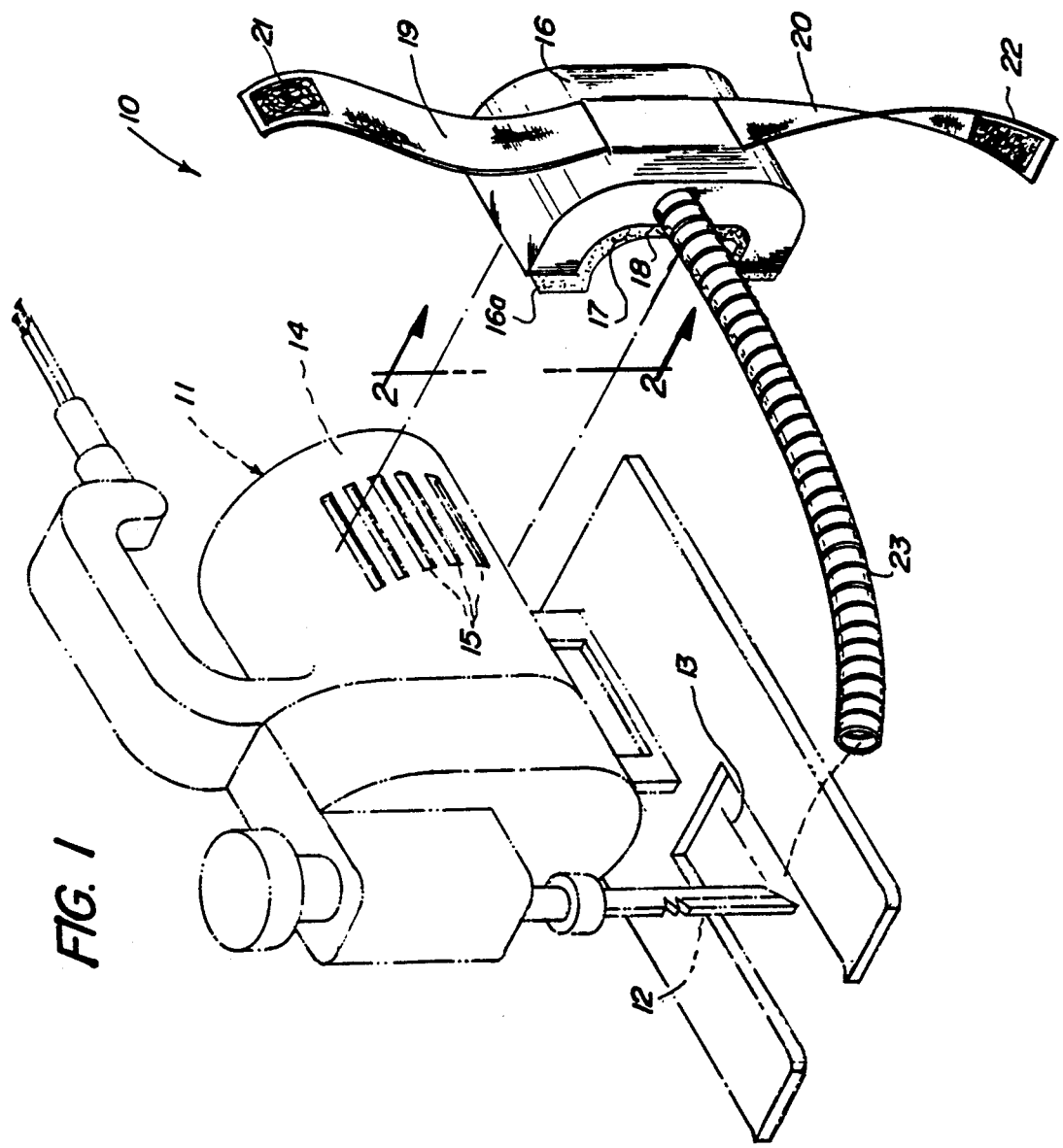
FIG. 1 is an isometric illustration of the instant invention.
Figure 2:
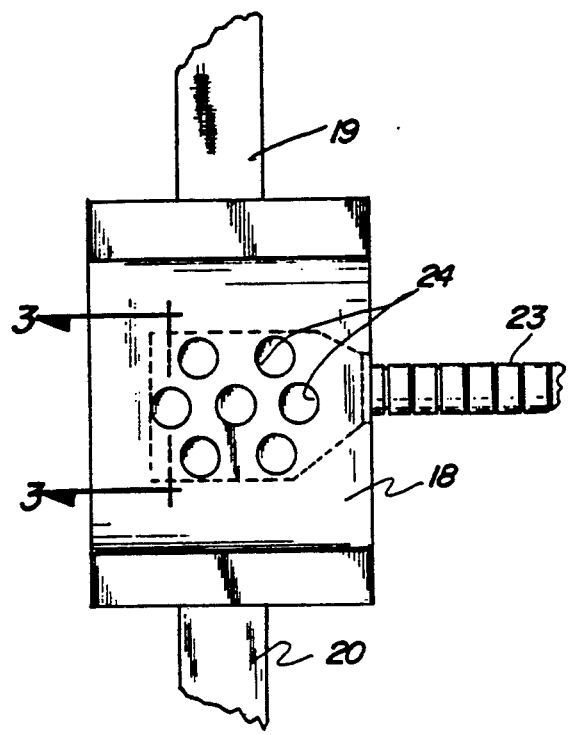
FIG. 2 is an orthographic view, taken along the lines 2—2 of FIG. 1 in the direction indicated by the arrows.
Figure 3:
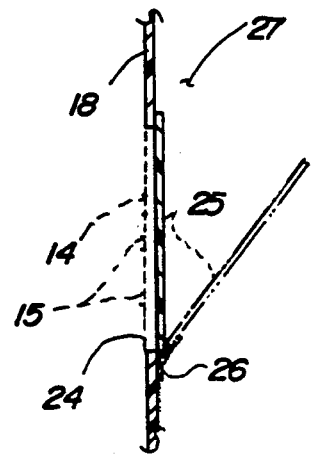
FIG. 3 is an orthographic view, taken along the lines 3—3 of FIG. 2 in the direction indicated by the arrows.

With reference now to the drawings, and in particular to FIGS. 1 to 6 thereof, a new and improved sawdust removal apparatus embodying the principles and concepts of the present invention and generally designated by the reference numeral 10 will be described.

More specifically, the sawdust removal apparatus 10 of the instant invention essentially comprises a saw member 11, formed with a saw blade 12 to direct the saw blade along a cutting line 13 during a cutting procedure. The saw member 11 is further formed with a saw member housing 14 to include motor vent slots 15 therethrough.

A hollow manifold housing 16 is provided to include a housing concave arcuate inner wall 18 defining an inner wall cavity 17 arranged for confrontation and securement about the housing 14 overlying the motor vent slots 15. As illustrated in FIG. 1, a gasket 16a (typically of a polymeric construction) is mounted in a peripheral orientation relative to a periphery of the housing 16 to ensure sealing of the housing relative to and in surrounding relationship to the vent slots 15. A first and second strap member 19 and 20 mounted to the housing 16 include respective first and second hook and loop fastener patches 21 and 22 for surrounding relationship about the housing 14 for securement of the manifold housing about the saw member housing 14. A directional conduit 23 of a flexible goose neck rib construction, as illustrated in FIG. 1 for example, is in pneumatic communication with the manifold housing chamber 27 within the manifold housing 16 to receive pressurized air directed from the motor vent slots 15 into the housing chamber 27 through inner wall apertures 24 directed through the manifold housing inner wall 18. The FIG. 3 notes that each aperture 24 cooperates with a valve plate 25 mounted within the chamber 27 by a spring hinge 26 to normally bias each valve plate 25 in a pneumatically sealed relationship within the chamber over and rearwardly of each aperture 24. Upon actuation of the saw member 11, air directed from the saw member's motor through the motor vent slots 15 deflects the valve plates 25 to direct pressurized air into the chamber 27. Normal closure of the valve plates prevents debris from within the manifold housing 16 from entering the saw member 11 through the vent slots 15.

The apparatus as illustrated in the FIGS. 4 and 5 illustrate the use of a blower motor 28, including fan blades 29 arranged in pneumatic communication with the manifold housing chamber 27, with the blower motor 28 mounted within a blower motor housing 30. An on/off switch 31 mounted to the blower motor housing 30 is operative through batteries 32 that are serviced through an access door 33 in the blower motor housing 30 to direct pressurized air into the manifold housing chamber 27 in the event a saw member 11 is formed without motor vent slots 15, in a manner as illustrated in FIG. 1.

Figure 6:
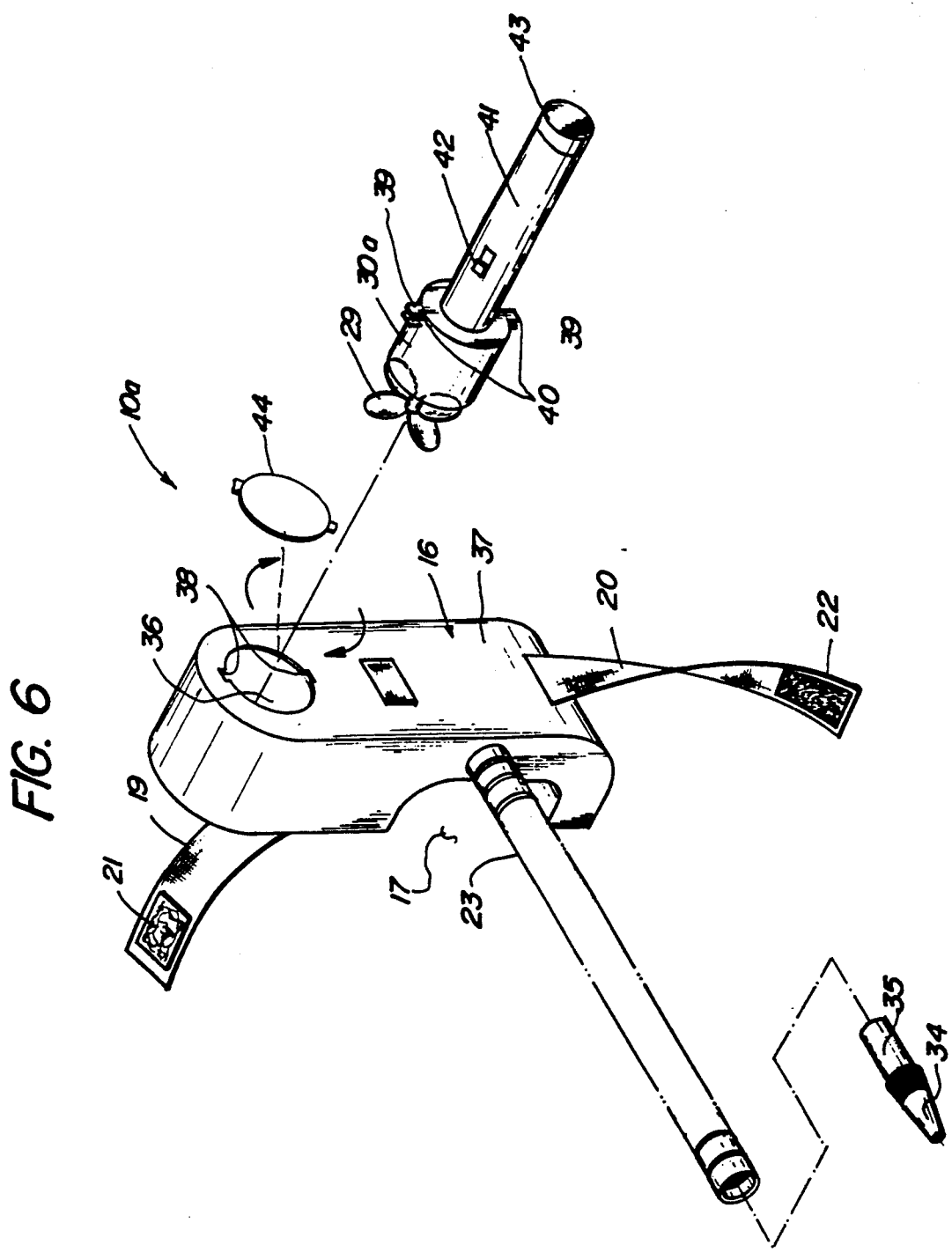
FIG. 6. is a modified aspect of the invention.

The apparatus 10a, as illustrated in FIG. 6, further notes that the use of a modified blower motor housing 30a includes fan blades 29 mounted at a forward distal end thereof. The fan blades and the blower motor housing 30a are arranged for projection through a blower motor opening 36 formed within a rear wall 37 of the manifold housing 16 The blower motor opening 36 is formed with diametrically aligned notches 38, and it should be further noted the blower motor housing 36 is formed of a predetermined diameter substantially equal to a predetermined diameter defined by the modified blower motor housing 30a. Further, at a rear distal end of the blower motor housing 30a, plural pairs of flanges 39 are provided. Each pair of flanges is arranged in a spaced relationship to define a slot 40 therebetween, and the pairs of flanges are arranged in a diametrically aligned relationship relative to the blower motor housing 30a. In this manner, each pair of flanges 39 is received through one of the notches 36 to position the slots 40 into engagement with the rear wall 37, whereupon rotation of the modified blower motor housing 30a effects latching of the blower motor housing 30a relative to the housing rear wall 37. A battery housing 41 coaxially aligned relative to the blower motor housing 30a functions as a handle and is formed with a switch 42 operative to effect actuation of the fan blades 29 upon actuation of the switch. Battery members, of a type such as illustrated in FIG. 4, are received within the battery housing 41 and are serviced through an end cap 43 mounted to a rear distal end of the battery housing 41. It should be noted that a door plate 44 is normally positioned within the blower motor opening 36 and is removed to accommodate positioning of the modified blower motor housing 30a within the manifold housing 16. It should further be noted that the blower motor opening 36 is positioned above the arcuate cavity 17 of the manifold housing inner wall 18 to indirectly pressurize the manifold housing chamber 27. In this manner, the blower motor, as illustrated in FIG. 6, may cooperate with the vent openings 15 and thereby not interfere with operation of the inner wall apertures 24 and the associated valve plates 25 while simultaneously providing a source of pressurized air into the directional conduit 23.

It should be further noted that the directional conduit includes a directional conduit nozzle 34 arranged for reception within the directional conduit, the directional nozzle includes a directional nozzle cylindrical body 35 arranged for frictional engagement within the free distal end of the directional conduit for enhanced pressurizing of air against the cutting line 13 for removal of debris relative to the saw member 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A sawdust removal apparatus for use in combination with a saw member, wherein the saw member includes a saw member blade, and the saw member blade is directed along a cutting line, wherein the saw member includes a saw member housing, and the apparatus comprises, a manifold housing, the manifold housing including a concave arcuate inner wall, and the inner wall defining an inner wall cavity arranged for receiving the saw member housing therewithin, and the manifold housing having an upper end and a lower end and the manifold housing including a first strap member extending from the upper end of the manifold housing, and a second strap member extending from the lower end of the manifold housing, the first strap member including a first fastener and the second strap member including a second fastener arranged for securement of the manifold housing about the saw member housing, and the manifold housing including a manifold housing chamber contained therewithin, with a directional conduit mounted to the manifold housing into and in pneumatic communication with the manifold housing chamber, the directional conduit formed of a flexible goose neck rib construction to permit flexure of the directional conduit for orientation of the flexible conduit to the cutting line, and the manifold housing inner wall includes a plurality of inner wall apertures arranged for confrontation with the saw member housing, wherein the saw member housing is formed with motor vent slots to permit positioning of the motor vent slots adjacent the inner wall apertures, and each inner wall aperture includes a valve plate, the valve plate mounted interiorly of the manifold housing chamber to the inner wall of the manifold housing, with each valve plate including a spring hinge to bias the valve plate against an interior surface of the inner wall within the manifold housing chamber.

2. An apparatus as set forth in claim 1 wherein the manifold housing includes a manifold housing rear wall, and the rear wall including a blower motor opening directed therethrough, wherein the blower motor opening is positioned above the inner wall cavity and a blower motor arranged for reception with the blower motor opening.

3. An apparatus as set forth in claim 2 wherein the blower motor opening includes a plurality of diametrically opposed notches directed into the inner wall at diametrically opposed orientation relative to the blower motor opening, and the blower motor opening defined by a predetermined diameter, and the blower motor including a blower motor housing, the blower motor housing defined by a further predetermined diameter equal to the predetermined diameter of the blower motor opening, and a plurality of fan blades mounted to a forward distal end of the blower motor housing, and the blower motor housing including plural pairs of parallel flanges, each pair of parallel flanges defines a slot therebetween, and each pair of parallel flanges arranged in a diametrically opposed orientation relative to the blower motor housing for projection of the pairs of flanges through the blower motor opening and positioning the rear wall within the slot of each pair of flanges.

4. An apparatus as set forth in claim 3 including a battery housing extending coaxially aligned relative to the blower motor housing extending rearwardly thereof, wherein the battery housing includes a battery housing switch, and an end cap to permit positioning of a plurality of battery members within the battery housing, and a door plate removably mounted relative to the rear wall over the blower motor opening to permit removal of the door plate for positioning of the blower motor housing therethrough.

5. An apparatus as set forth in claim 4 wherein the directional conduit includes a directional conduit free end spaced from the manifold housing, and further including a directional nozzle, the directional nozzle including a cylindrical body directed rearwardly of the directional nozzle, and the cylindrical body is arranged for frictional engagement within the free end.

* * * * *